Jan. 10, 1928.  1,656,021
O. P. SCHUSTER
CONTROLLER
Filed June 17, 1924    3 Sheets-Sheet 1

WITNESSES:
G. S. Neilson
H. C. Sowe

INVENTOR
Otto P. Schuster.
BY
Wesley G. Carr
ATTORNEY

Jan. 10, 1928.

O. P. SCHUSTER 1,656,021

CONTROLLER

Filed June 17, 1924  3 Sheets-Sheet 2

WITNESSES:
G. S. Neilson
H. C. Sowe

INVENTOR
Otto P. Schuster.
BY
Wesley G. Carr
ATTORNEY

Jan. 10, 1928.

O. P. SCHUSTER 1,656,021

CONTROLLER

Filed June 17, 1924    3 Sheets-Sheet 3

WITNESSES:
G. S. Neilson
H. C. Lowe

INVENTOR
Otto P. Schuster
BY
Wesley S. Carr
ATTORNEY

Patented Jan. 10, 1928.

1,656,021

UNITED STATES PATENT OFFICE.

OTTO P. SCHUSTER, OF NORTH IRWIN, PENNSYLVANIA, ASSIGNOR TO WESTINGHOUSE ELECTRIC & MANUFACTURING COMPANY, A CORPORATION OF PENNSYLVANIA.

CONTROLLER.

Application filed June 17, 1924. Serial No. 720,509.

My invention relates to controllers and it has particular relation to controllers employed to govern electric-motor-driven vehicles.

One object of my invention is to provide a controller which shall be relatively simple and economical in construction and positive and reliable in operation.

Another object of my invention is to provide a control drum with a positioning device which shall permit the notching of the drum to a plurality of positions and which shall also permit the controller to be automatically returned to the "Off" position only after the drum has been actuated in one direction, the drum being adapted to be manually returned to the "Off" position after it has been actuated in the opposite direction.

Briefly speaking, my invention comprises mounting a star-wheel on the drum shaft of the controller, providing a rotatably mounted pawl lever on said shaft and mounting a pawl member on said pawl lever in such manner that the pawl member shall engage the star-wheel to effect notching of the controller, when the drum is actuated in one direction, and to return the drum to the "Off" position, when the drum is actuated in the opposite direction.

For a better understanding of my invention reference may be had to the accompanying drawings;

Figure 1 of which is a cross-sectional view of a portion of a controller constructed in accordance with my invention;

Referring particularly to Fig. 1 to Fig. 4, inclusive, a controller or switching device 1 is provided with a rear frame 2 and a hinged cover member 3. A top plate or cover member 4 is mounted on the frame 2.

Figure 2:
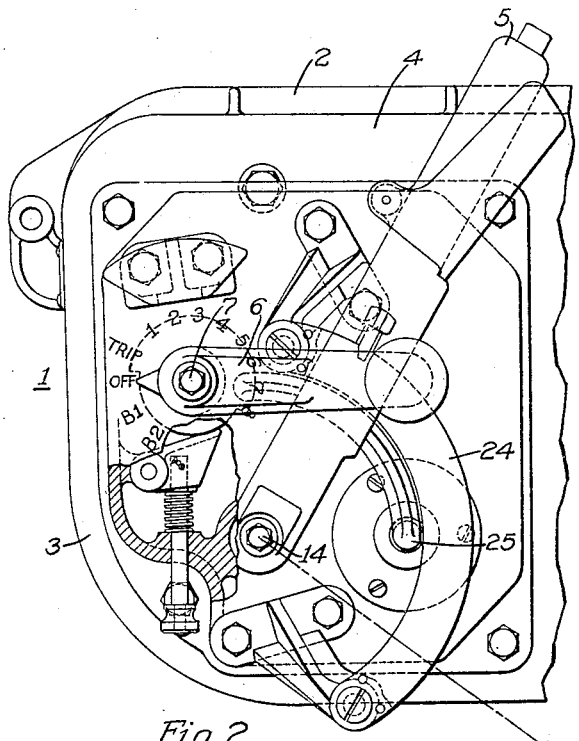
Fig. 2 is a plan view of a portion of the controller illustrated in Fig. 1.

The portion of the plate 4 that is illustrated in Fig. 2 of the drawings has mounted thereon a changeover drum handle 5 and a balance drum handle 6. The balance handle 6 is directly connected to the rotatably mounted shaft 7, in a manner which is best illustrated in Fig. 2.

Figure 7:
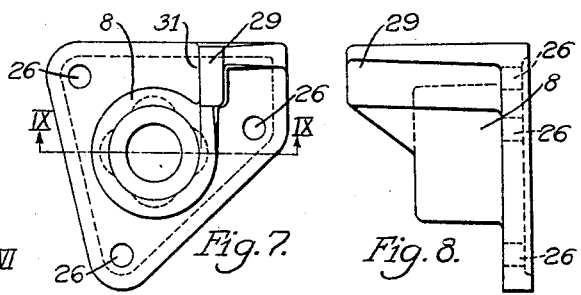
Figure 8:
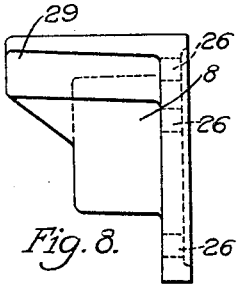
Figure 9:
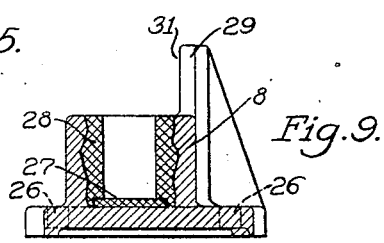

The shaft 7 is rotatably mounted in a lower bearing member 8, shown in detail in Figs. 7, 8 and 9 which is secured to a base plate 9 of the controller 1. The balance drum 11 is rigidly mounted upon the shaft 7. The changeover drum 12 is loosely mounted upon the shaft 7 to permit the shaft 7 and the drum 12 to be rotated independently one from the other.

Figure 4:
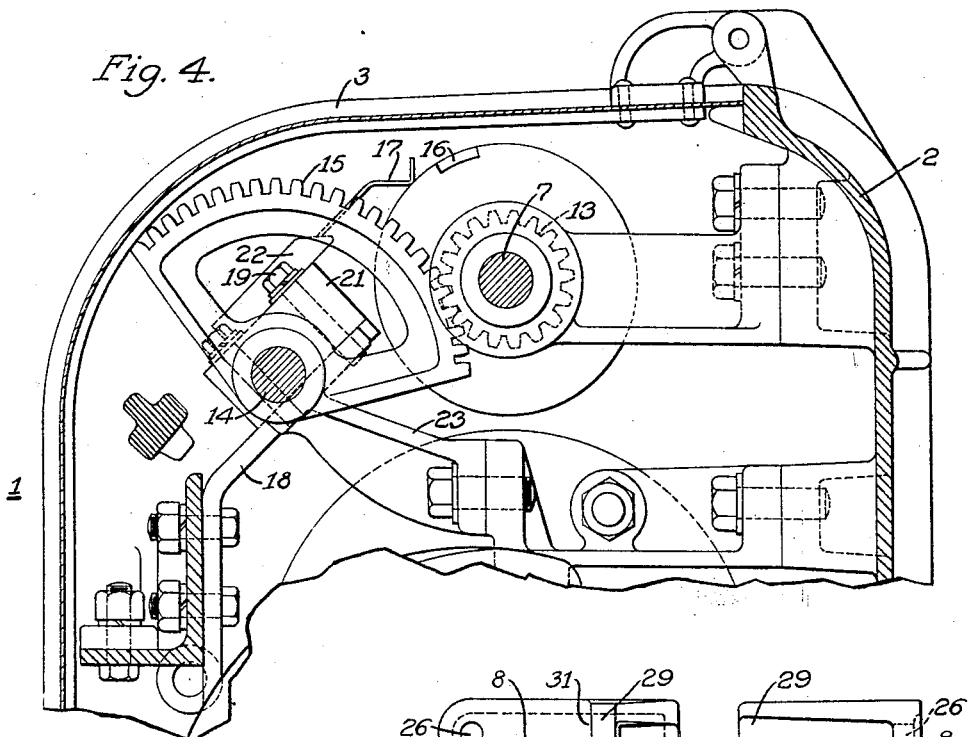
Fig. 4 is a cross-sectional view of a portion of the controller illustrated in Fig. 1.

The drum 12 is provided with a gear member 13 that is rigidly secured thereto, as is best illustrated in Fig. 4. The changeover drum handle 5 is secured to a relatively short shaft 14, which is rotatably mounted in a stationary bracket or bearing 23. A segmental gear member 15 is rigidly secured to the shaft 14 and engages the gear member 13 in such manner that, when the changeover drum handle 5 is actuated in a clockwise direction, the change-over drum 12 is actuated in a counter-clockwise direction. The change-over drum 12 and the balance drum 11 are each provided with a plurality of contact segments 16, which may be of any desired shape to co-operate with stationary control fingers 17 to make and break electrical circuits. The control fingers 17 are securely mounted upon a stationary flange member 18 by means of a plurality of bolts 19 and insulatable blocks 21 and 22.

The change-over drum handle 5 is provided with a notching plate 24 to aid in the positioning of the handle 5 by the operator. A push-button device 25, which is mounted upon the cover plate 4, is illustrated in Fig. 2.

The balance drum 11 is adapted to occupy a plurality of positions when rotated in either a clockwise direction or a counter-clockwise direction.

The normal position of the balance drum 11 is its "Off" position. When the balance drum 11 is actuated in a clockwise direction, it first occupies a "Trip" position and may then successively occupy starting positions 1 to 8, inclusive, as is illustrated, by the markings of the cover plate 4 in Fig. 2. When the balance drum 11 is actuated in a counter-clockwise direction, it may occupy either its first or its second balance position 1 marked respectively B1 and B2 on the cover plate 4.

Figure 1:
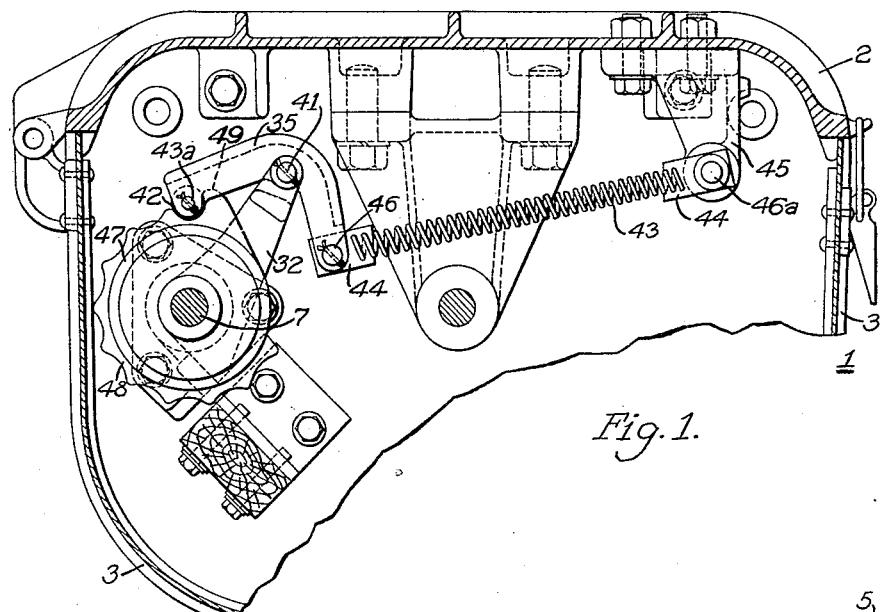
Figure 3:
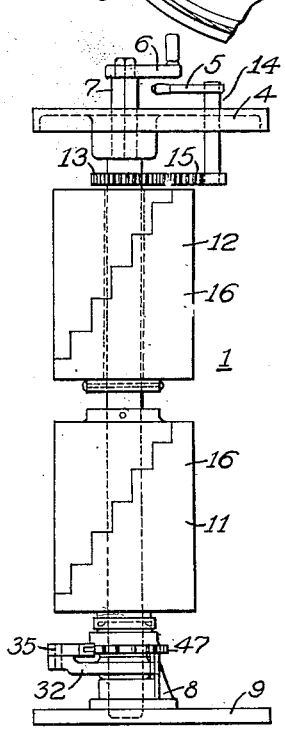
Fig. 3 is a semi-diagrammatic view, in side elevation, illustrating how two drums are mounted on the same controller shaft.

Referring particularly to Fig. 1 the shaft 7 is mounted in the bearing 8, which is best illustrated in Figs. 7 and 9, inclusive. The bearing 8 is provided with a relatively flat base in which there are a plurality of holes 26 for securing it to the base member 9 of the controller 1.

Figure 10:
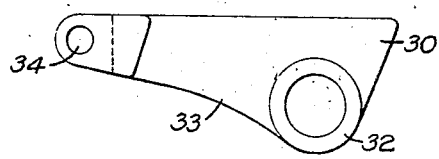
Figure 11:
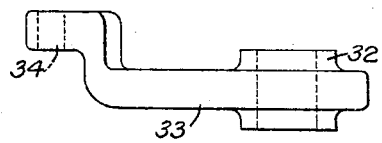

The bearing 8 is provided with a plate or disc 27, upon which the shaft 7 rests, and a collar member 28. The plate 27 and the collar member 28 are made of a suitable alloy for reducing the friction thereof upon the shaft 7. The bearing 8 is provided with an upwardly projecting portion 29, which has a flat face 31. A pawl lever 32 is rotatably positioned upon the shaft 7 above the bearing 8 and is provided with a flanged portion 30 (see Fig. 10), which is adapted to engage the face 31 of the projecting portion 29 of the bearing 8 when the pawl lever 32 is turned in a clockwise direction.

The pawl lever 32 is provided with an arm 33, which is bent in the form of an S and is provided with a hole 34 at its outer end.

Figure 13:
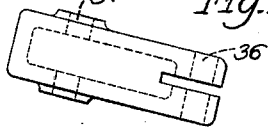
Figure 12:
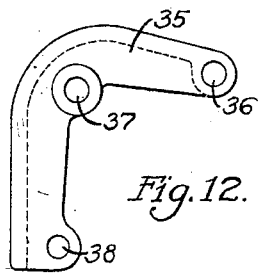
Figure 14:
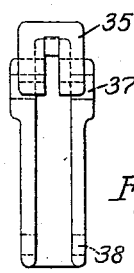

An L-shaped pawl member 35, which is best illustrated in Figs. 12 to 14, inclusive, is so constructed as to be of substantially U-shape in cross section and is provided with a plurality of bolt or pin holes 36 to 38, inclusive. The pawl member 35 is turnably mounted upon the arm 33 of the pawl lever 32 by means of a pin 41, which is positioned in the holes 34 and 37 of the pawl lever 32 and pawl member 35, respectively.

A roller 42 is rotatably mounted on a pin 43a, which is positioned in the hole 38 of the pawl member 35. A resilient member or coil spring 43 is provided with relatively flat end members 44. One of the flat end members 44 of the resilient member 43 is turnably mounted on a pin 46 that is positioned in the hole 36 of the pawl member 35 while the other flat end member 44 is mounted in a stationary arm or bracket 45 by means of a pin 46a.

Figure 5:
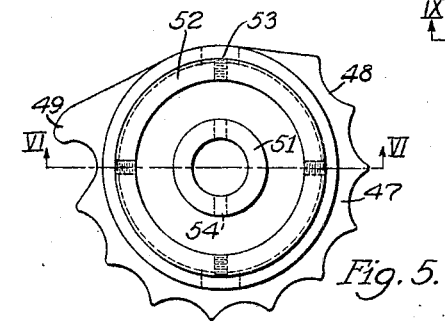
Fig. 5 to Fig. 14, inclusive are detail views of parts of the controller illustrated in Fig. 1.
Figure 6:
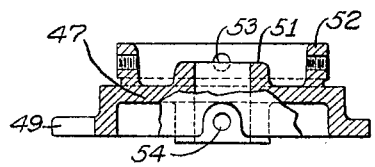

The drum 11 is provided with a star-wheel 47, which is best illustrated in Fig. 5 and Fig. 6. The star-wheel 47 is provided with a plurality of uniformly spaced notches 48, while, near the initial notch 48, is a projecting flange or lug 49. The star-wheel is also provided with a collar 51 for mounting it upon the shaft 7 and with an upwardly projecting collar 52, surrounding the collar 51 and having a plurality of bolt-holes 53 for securing the star-wheel 47 to the balance drum 11. A plurality of bolt-holes 54 are provided for securing the drum 11 to the shaft 7.

The operation of the change-over drum 12 of the controller 1 is effected by actuating the change-over drum handle 5 in a clockwise direction, thereby causing the segmental gear 15 to rotate the gear member 13, which is secured to the changeover drum 12, in a counter-clockwise direction.

The operation of the balance drum 11 is effected by actuating the balance drum handle 6 in a counter-clockwise direction to positions B1 and B2, thereby causing the balance drum 11 to also turn in a counter-clockwise direction. The star wheel 47 thereupon forces the pawl member 35 in a clockwise direction to correspondingly actuate the pawl lever 32, whereby tension is applied to resilient member 43.

When the operator releases the handle 6 the resilient member 43 pulls the pawl member 35 in a counter-clockwise direction, thereby returning the balance drum 11 to the "Off" position. The drum 11 will not pass beyond the "Off" position in a clockwise direction unless manually actuated, as the face 30 of the pawl lever 32 engages the face 31 of the bearing 8.

When the handle 6 is actuated in a clockwise direction, the balance drum 11 is correspondingly actuated in the same direction, thereby causing the star wheel 47 to alternately operate the pawl member 35 outwardly and inwardly. The pawl member 35 tends to turn in a counter-clockwise direction because of the resilient member 43, thereby bringing the roller 42 in intimate engagement with the notches 48 of the star wheel 47.

The action of the roller 42 upon the star-wheel 47 prevents the balance drum 11 occupying improper intermediate positions. In the present case, the balance drum 11 will not return to the "Off" position, if the handle 6 is released by the operator, but must be manually actuated in a counter-clockwise direction.

From the above description it is apparent that I have provided a mechanical device for effecting the automatic return of a controller to its "Off" position only after the controller has been actuated in one direction and have provided means for accurately positioning the controller when it is actuated in another direction.

While I have shown my invention in its preferred form, it is apparent that minor modifications may be made in the arrangement of parts without departing from the spirit thereof. I desire, therefore, to be limited only by the scope of the appended claims.

I claim as my invention:

1. In a controller, the combination with a switching device having a plurality of positions, of means for actuating said device in a plurality of directions, means for returning said device to a predetermined position upon its being actuated in one direction, and means for effecting notching of said device upon its being actuated in another direction.

2. In a controller, the combination with a switching device having a plurality of positions, of means for rotating said device in a plurality of directions, means for returning said device to a predetermined position upon its being rotated in one direction, and means for effecting step by step advancement of said device upon its being actuated in another direction.

3. In a controller, the combination with a movably mounted drum, of means for rotating said drum in two directions, automatic means for returning said drum to a predetermined position upon its being actuated in one direction, and means for effecting step-by-step advancement of said drum upon its being actuated in another direction.

4. In a controller, the combination with a rotatably mounted switching device, of means for rotating said device in two directions to occupy a plurality of positions, means comprising a resilient member for returning said device to a predetermined position upon said device being actuated in one direction and means for definitely positioning said switching device upon its being actuated in another direction.

5. In a controller, the combination with a switching device having a plurality of positions, of means for turning said device to any one of said positions, a pawl for governing said device and means comprising a lever disposed to move in one direction with the switching device for movably supporting said pawl to engage said device.

6. In a controller, the combination with a switching device having a plurality of positions, of means for turning said device to any one of said positions, a rotatably mounted lever disposed to rotate in one direction with the switching device, and means comprising a spring-controlled pawl mounted upon said lever for governing said device and returning it to a predetermined position when released.

7. In a controller, the combination with a rotatable shaft, of a switching device mounted upon said shaft, means for rotating said shaft, a star-wheel mounted upon said shaft, a lever turnably mounted upon said shaft, a pawl pivotally mounted upon said lever and adapted to engage said star-wheel, and means for biasing said pawl member to a predetermined position.

8. In a controller, the combination with a rotatable shaft, of a switching device mounted upon said shaft, means for rotating said shaft, a star-wheel mounted upon said shaft, a lever turnably mounted upon said shaft, means for limiting the angular movement of said lever, a pawl pivotally mounted upon said lever and adapted to engage said star-wheel, and resilient means for biasing said pawl to a predetermined position.

In testimony whereof, I have hereunto subscribed my name this 11th day of June 1924.

OTTO P. SCHUSTER.